June 23, 1936.    E. C. HORTON    2,045,143
WINDSHIELD CLEANER
Filed July 5, 1934
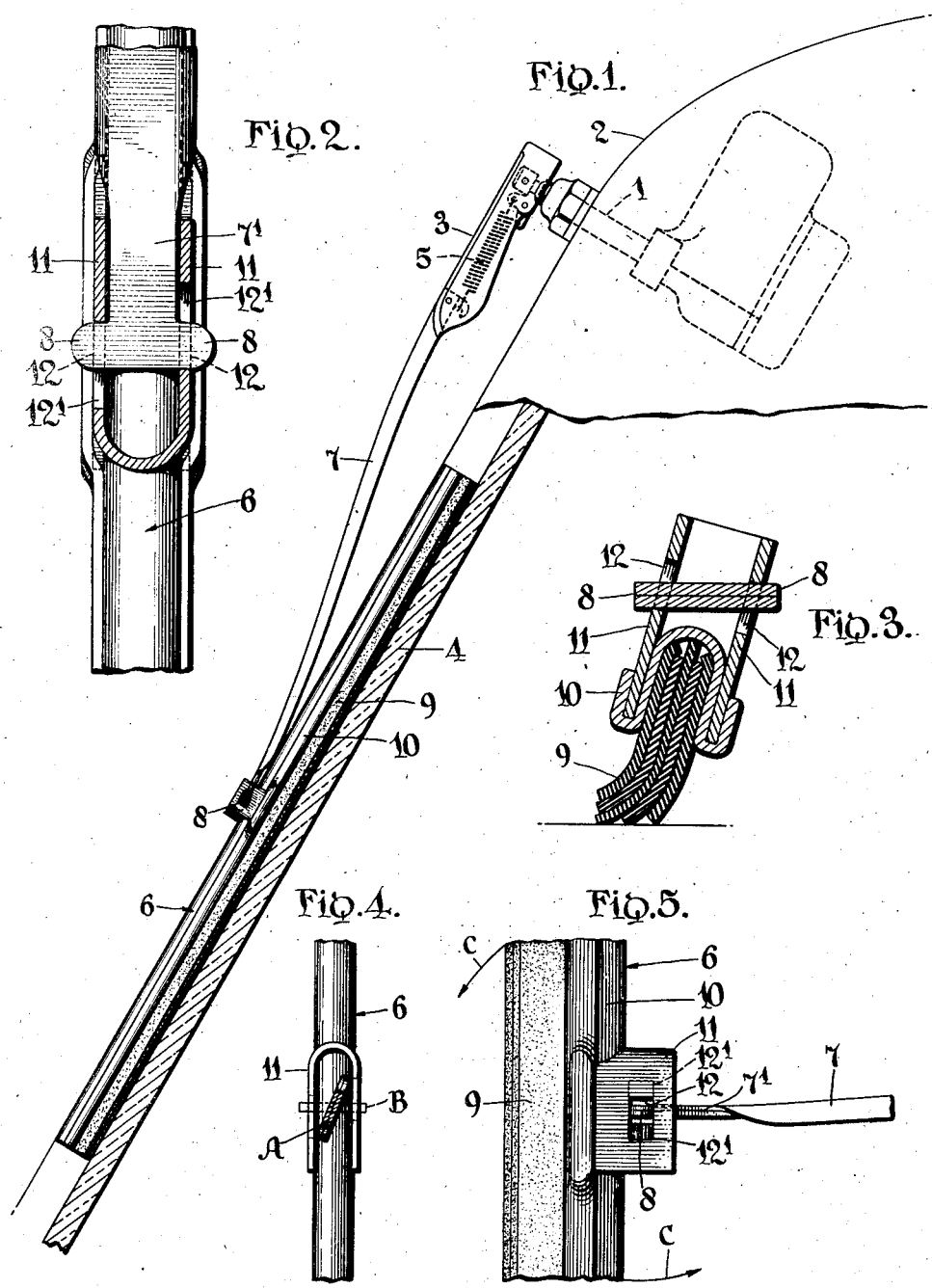
INVENTOR
Erwin C. Horton.
BY
Beau & Brooks
ATTORNEYS Patented June 23, 1936

2,045,143

UNITED STATES PATENT OFFICE 2,045,143

WINDSHIELD CLEANER

Erwin C. Horton, Hamburg, N. Y., assignor to Trico Products Corporation, Buffalo, N. Y.

Application July 5, 1934, Serial No. 733,920

10 Claims. (Cl. 15—250)

This invention relates to a windshield cleaner and has particular reference to the attachment of the wiper to its carrying arm.

Detachable connections have heretofore been provided in which the wiper or blade is connected to its arm by relative movement of the wiper in a plane perpendicular to the windshield glass. Consequently, when the wiper was lifted from the glass for cleaning the latter with a cloth, it sometimes happened that the wiper would become displaced from the arm and permit the latter to spring back sharply against the glass.

The present invention has for its object to provide an improved means of attachment or mounting for the wiper by which the latter will be more secure in its attachment to the carrying arm. The invention further has for its aim to insure a proper positioning of the wiper with respect to the arm and glass when the windshield cleaner is at rest.

In the drawing:

Fig. 1 is a fragmentary sectional view of a windshield or window equipped with a cleaner embodying the preferred embodiment of the present invention;

Fig. 2 is a longitudinal horizontal section through the wiper and arm connection;

Fig. 3 is a transverse section through such connection; and

Figs. 4 and 5 are respectively plan and side elevational views illustrating more clearly the mode of attachment of the wiper to its arm.

Referring more particularly to the drawing, the numeral 1 designates a wiper operating shaft journalled in the header construction 2 of the motor vehicle windshield and supporting on its outer end the articulated wiper carrying arm 3, the free end of which is resiliently urged toward the windshield glass 4, as by means of a spring 5, so as to firmly hold the wiper or wiping blade 6 under proper wiping pressure against the glass. The arm and wiper have interlocking parts by which the wiper is attached to the arm. One of these parts consists of a substantially T-shaped head and is preferably carried by the arm. To this end the outer pivoted section 7 of the articulated arm 3 is provided with a reduced shank carrying a pair of oppositely extending trunnion parts or ears 8. The companion or cooperating part is preferably carried by the wiper which may comprise the usual flexible rubbing element or elements 9 secured in the metal channel or holder 10. To the latter is fixedly secured such companion part herein depicted as a separate attaching clip or member which has opposing walls 11 with registering recesses or openings 12, the latter being extended in relatively opposite directions to provide offset entrance extensions 12'. Or, in viewing this from another angle the openings or slots are offset relative to each other but have the overlapping or registering portions to receive the ears or lugs 8 when the arm and wiper are operatively related.

When attaching the arm to the wiper, the outer end of the former is swung outwardly from the glass and the wiper is positioned at right angles to the longitudinal axis of the arm, and the ears inserted between the walls 11 substantially as indicated at A in Fig. 4. Then the wiper and arm are relatively rotated about the longitudinal axis of the arm to cause the ears 8 to enter the offset entrance extensions 12' and pass on into the main registering portions of the openings 12, as indicated by the broken line showing at B in Fig. 4 and in the full line showing in the remaining views of the drawing. This relative rotative movement between the wiper and arm engages the ears in the openings 12 so that the wiper may now be swung in a position at right angles to its plane of previous movement, or in the direction indicated by the arrow C in Fig. 5. Such movement of the wiper will bring the reduced shank portion 7' of the wiper arm 7 into the space between the walls 11 so that the latter will prevent swinging displacing movement of the blade on the arm. Thus, the side walls 11 interlock and interengage with the wiper carrying arm in preventing unauthorized detachment of the wiper. The arm shank 7' is urged down into the space between the walls 11 by the pressure applied by the spring 5. This spring not only provides the required pressure in the wiping contact on the windshield but it further tends to normalize the wiper with respect to the glazed surface or bring it to an upright position from its operative inclined or dragging position. This is accomplished by the downward urge of the ears 8 on the upper one of the bottom edges of openings 12 (Fig. 3) which will tend to bring the wiper upright as determined by the engagement of both ears with the bottom walls of their respective openings. This normalizing action or upright positioning of the wiper will be facilitated and expedited by the vibration of the vehicle during travel.

The clip is preferably secured to the wiper in a rigid manner, and sufficient play or looseness is provided in the connection between the arm and clip to permit the wiper to incline or drag at the proper angle as it is drawn across the glass.

According to the present disclosure, the wall openings 12 are of greater height (from the windshield) than the thickness of the ears 8 so that the wiper may rock back and forth on the ears, as indicated in Fig. 3, at the beginning of each wiping stroke.

In detaching the wiper from the arm, it is first required to swing the wiper to withdraw the shank portion 7' from between the walls 11 whereupon the wiper may be rotated substantially about the longitudinal axis of the arm section 7 to withdraw the ears from the openings 12. The wiper is then free to be lifted from over the T-shaped head of the carrying arm. It will thus be observed that a compound movement of the wiper is required in order to attach and detach it, first in the longitudinal plane of the arm and then in a transverse plane. The mounting of the wiper is effected without the employment of tools or separable attaching parts which might become lost or impaired against further use. The cooperating arm and wiper parts are readily formed and stamped from sheet metal and provide a practical and serviceable connection.

What is claimed is:

1. A windshield cleaner having a wiper and a carrying arm therefor, said arm being provided with oppositely extending trunnion parts forming a substantially T-shaped head connected to the arm by a shank portion, said wiper having opposed wall portions with offset openings, such openings having registering portions to receive the parts upon rotative movement of the wiper about the longitudinal axis of the arm and in a plane substantially at right angles thereto, said shank portion being movable into the space between said wall portions by movement of the wiper about the axis of said parts for being engaged thereby to secure the wiper against substantial movement on the arm when in operative relation.

2. A wiper having opposed walls with registering openings, such wall openings having relative oppositely offset and non-registering entrance portions adapted to permit the entry of oppositely projecting parts of a wiper carrying arm into the registering openings upon relative angular movement between the arm and wiper.

3. A windshield cleaner having a wiper, a carrying arm therefor having oppositely extending parts, the wiper having opposed wall portions with registering openings to receive said projecting parts, the wall openings having non-registering entrance portions extending in opposite directions from each other to permit the passage of said transverse parts into the wall openings upon angular movement of the wiper in a plane substantially parallel to the axis of said parts.

4. A wiper having opposed walls, said walls having registering openings with offset non-registering entrance portions, and a wiper carrying arm having oppositely projecting parts engageable in the registering openings by entry through such portions upon relative angular movement between the arm and wiper about the longitudinal axis of the arm.

5. A windshield cleaner having a wiper element and an arm element, one of said elements having a substantially T-shaped head and the other element having substantially parallel wall portions provided with registering openings enlarged in opposite directions to permit the oppositely extending parts of the T-shaped head being engaged and disengaged by a rotative movement of the head in the plane of the opening enlargements, the walls having parts interlocking with the shank of the T-shaped head to secure the head against such rotative movement.

6. A windshield cleaner having a wiper element and an arm element, one of said elements having oppositely extending parts and the other element having opposed walls with openings enlarged in opposite directions, the enlarged portions of said openings being spaced a greater distance apart than the main portions of the openings whereby upon rotative movement of the parts in the plane of such opening enlargements the oppositely extending parts may be engaged with and disengaged from the wall openings, and means for interlocking the first element with said other element to secure the parts against such rotative movement.

7. A windshield cleaner having a wiper element and an arm element, one element having a shank with oppositely extending parts and the other element having opposed walls with openings to receive said oppositely extending parts, the wall openings having entrance ways with the entrance way of one opening facing in the opposite direction to the entrance way of the opening of the opposed wall, whereby upon relative rotative movement of said parts and walls in the plane of the entrance ways, the oppositely extending parts may be engaged with and disengaged from such openings, and means interlocking the shank with said other element for securing said elements against such relative rotative movement.

8. A windshield cleaner having a wiper element and an arm element, one element having oppositely extending parts and the other element having opposed walls with openings freely receiving said parts, such openings being of greater height than said parts to permit rocking of said wiper on the arm, and said openings having offset entrance ways extending in opposite directions and through which said parts may pass upon rotating the wiper about the arm.

9. A windshield cleaner having a wiper element and an arm element, one element having opposed walls with registering openings, the other element having oppositely extending trunnion parts proportioned with respect to the openings so that they are engageable in the openings by interposing the parts between the walls and relatively rotating the latter about the former, and means for holding the wiper against displacing turning movement about the arm.

10. A windshield cleaner having a wiper element and an arm element, one element having opposed walls with registering openings, the other element having oppositely extending trunnion parts proportioned with respect to the openings so that they are engageable in the openings by interposing the parts between the walls and rotating the latter in a plane at an angle to the longitudinal axis of the arm, said wiper being pivotal about the axes of said trunnion parts to dispose the adjacent portion of the arm between said walls to thereby secure the wiper against displacing movement when engaged with the windshield.

ERWIN C. HORTON.